Figure 1:
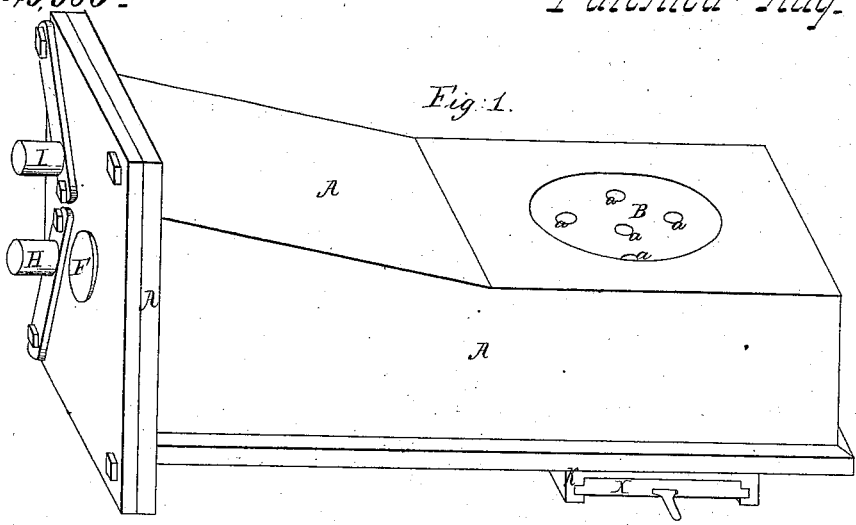
Figure 2:
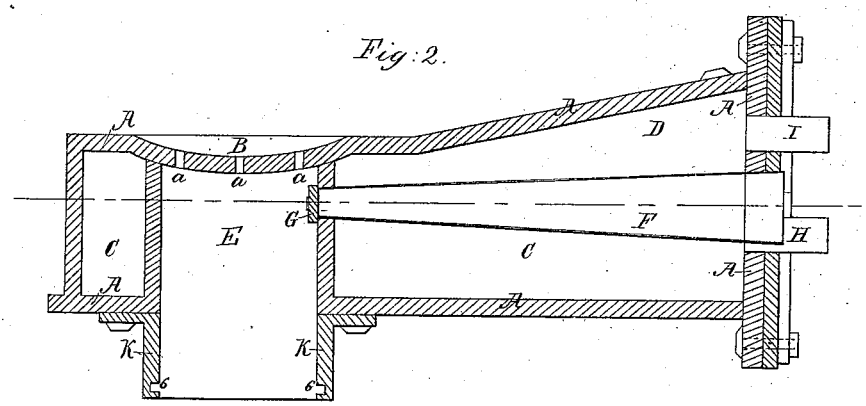
Figure 3:
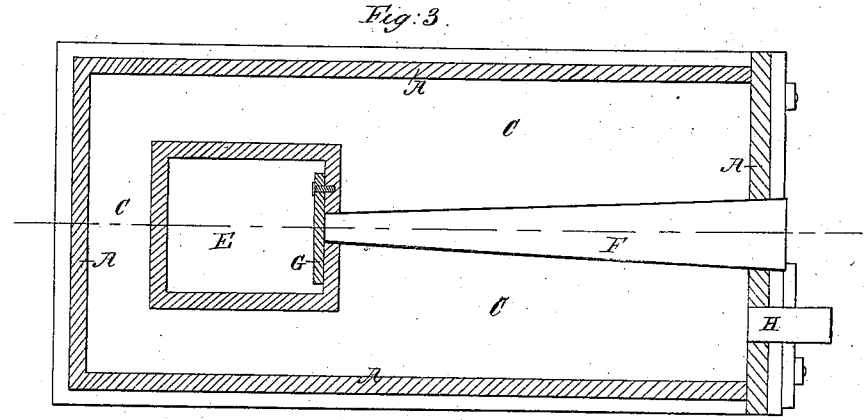

S. C. Gray,
Tuyere,

N° 43,683. Patented Aug. 2, 1864.

Witnesses:
John B. Legood
Jas. L. Smithinger

Inventor,
Samuel C. Gray

UNITED STATES PATENT OFFICE.

SAMUEL C. GRAY, OF LEWISVILLE, INDIANA.

IMPROVEMENT IN TUYERES.

Specification forming part of Letters Patent No. 43,683, dated August 2, 1864.

*To all whom it may concern:*

Be it known that I, SAMUEL C. GRAY, of Lewisville, in the county of Henry, State of Indiana, have invented a new and Improved Tuyere; and I do hereby declare that the following is a full and exact description thereof, reference being had to the accompanying drawing, and to the letters of reference marked thereon.

The nature of my invention consists in using an air conducting pipe, F, leading from the bellows to a square ash-pit, E, beneath the fire-place B. This air-pipe is surrounded with a body of water, which is contained in a tank, A A A, &c. This tank is supplied with water through the pipe H. The water surrounds the ash-pit E, and escapes through the pipe I. The fire-place B is provided with five perforations, a a a a a. At the end of air-pipe F, in the ash-pit, is a valve, G, for regulating the draft as may be necessary. At the bottom of the ash-pit E is a slide, b b, for removing the ashes from the pit.

What I claim as my invention, and desire to secure by Letters Patent, is—

The combination of the air-pipe F with the valve g, and ash-pit E, the water-pipes H and I, the first for supplying the tank with water and the second named for the escape of water, and the manner in which the water surrounds the pipe F and ash-pit E, the shape of the tank A A A, &c., and fire-place B, all arranged and operating substantially as and for the purpose shown and described.

SAMUEL C. GRAY.

Witnesses:
JOHN B. OSGOOD,
JNO. L. SMITHMYER.